(12) United States Patent
Perez et al.

(10) Patent No.: US 8,892,887 B2
(45) Date of Patent: Nov. 18, 2014

(54) METHOD AND APPARATUS FOR MUTUAL AUTHENTICATION

(75) Inventors: Aram Perez, San Diego, CA (US); Lakshminath Reddy Dondeti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1240 days.

(21) Appl. No.: 11/866,946

(22) Filed: Oct. 3, 2007

(65) Prior Publication Data

US 2008/0155260 A1 Jun. 26, 2008

Related U.S. Application Data

(60) Provisional application No. 60/850,882, filed on Oct. 10, 2006.

(51) Int. Cl.
*H04L 9/32* (2006.01)
*H04L 9/08* (2006.01)

(52) U.S. Cl.
CPC ............ *H04L 9/3273* (2013.01); *H04L 9/3242* (2013.01); *H04L 2209/603* (2013.01); *H04L 2209/38* (2013.01); *H04L 9/3263* (2013.01); *H04L 2209/80* (2013.01); *H04L 9/0869* (2013.01)
USPC .......................................... 713/169; 709/224

(58) Field of Classification Search
USPC .................. 713/169, 194, 156, 183; 709/224; 705/52, 59, 64–70, 71
See application file for complete search history.

(56) References Cited

U.S. PATENT DOCUMENTS

| 6,151,676 | A | * | 11/2000 | Cuccia et al. ................. 713/176 |
| 6,225,888 | B1 | * | 5/2001 | Juopperi ......................... 340/5.8 |
| 6,766,453 | B1 | * | 7/2004 | Nessett et al. ................. 713/171 |
| 6,769,060 | B1 | * | 7/2004 | Dent et al. ..................... 713/168 |
| 6,920,559 | B1 | * | 7/2005 | Nessett et al. ................. 713/168 |

(Continued)

FOREIGN PATENT DOCUMENTS

| JP | 2003124927 | | 4/2003 |
| JP | 2003131950 | A | 5/2003 |
| WO | 2005091551 | | 9/2005 |
| WO | 2006103176 | A1 | 10/2006 |

OTHER PUBLICATIONS

C. Kaufman, Ed., Internet Key Exchange (IKEv2) Protocol, Microsoft, Dec. 2005.

(Continued)

*Primary Examiner* — Kambiz Zand
*Assistant Examiner* — Phy Anh Vu
(74) *Attorney, Agent, or Firm* — Won Tae Kim

(57) ABSTRACT

Disclosed is a method for mutual authentication between a station, having a digital rights agent, and a secure removable media device. The digital rights agent initiates mutual authentication by sending a message to the secure removable media device. The secure removable media device encrypts a first random number using a public key associated with the digital rights agent. The digital rights agent decrypts the encrypted first random number, and encrypts a second random number and a first hash based on at least the first random number. The secure removable media device decrypts the encrypted second random number and the first hash, verifies the first hash to authenticate the digital rights agent, and generates a second hash based on at least the second random number. The digital rights agent verifies the second hash to authenticate the secure removable media device.

30 Claims, 3 Drawing Sheets

(56) References Cited

U.S. PATENT DOCUMENTS

| | | | |
|---|---|---|---|
| 7,024,690 B1* | 4/2006 | Young et al. | 726/5 |
| 7,251,729 B1* | 7/2007 | Park | 713/168 |
| 7,694,335 B1* | 4/2010 | Turner et al. | 726/14 |
| 7,814,318 B1* | 10/2010 | Perlman et al. | 713/165 |
| 8,458,458 B2* | 6/2013 | Asano et al. | 713/158 |
| 2002/0026577 A1* | 2/2002 | Futamura et al. | 713/156 |
| 2003/0007640 A1 | 1/2003 | Harada et al. | |
| 2003/0191956 A1* | 10/2003 | Ishiguro et al. | 713/193 |
| 2003/0233450 A1* | 12/2003 | Carley | 709/224 |
| 2004/0039906 A1* | 2/2004 | Oka et al. | 713/156 |
| 2004/0054889 A1* | 3/2004 | Pitsos | 713/156 |
| 2004/0236819 A1* | 11/2004 | Anati et al. | 709/200 |
| 2005/0210279 A1* | 9/2005 | Lee et al. | 713/194 |
| 2006/0036850 A1* | 2/2006 | Enokida | 713/156 |
| 2006/0053302 A1* | 3/2006 | Yasaki et al. | 713/183 |
| 2006/0282662 A1* | 12/2006 | Whitcomb | 713/156 |
| 2009/0037728 A1* | 2/2009 | Kamikura | 713/156 |

OTHER PUBLICATIONS

Open Mobile Alliance Ltd., OMA-TS-DRM-DRM-V2_0-20060303-A, DRM Specification, Approved Version 2.0, Mar. 3, 2006.

Written Opinion—PCT/US07/080525, International Search Authority—European Patent Office—Apr. 21, 2008.

Menezes et al: "Handbook of Applied Cryptography" Handbook of Applied Cryptography. CRC Press Series in Discrete Mathematices and Its Applications, Boca Raton, FL, CRC Press, US, 1997, pp. 403-405, 506, XP002165287.

International Search Report—PCT/US07/080525, International Search Authority—European Patent Office—Apr. 21, 2008.

Menezes, A. J. et al., "Handbook of Applied Cryptography", CRC Press, 1997, p. 507-510.

Taiwan Search Report—TW096137890—TIPO—Jun. 21, 2011.

* cited by examiner

METHOD AND APPARATUS FOR MUTUAL AUTHENTICATION

CLAIM OF PRIORITY UNDER 35 U.S.C. §119

The present Application for Patent claims priority to: Provisional Application No. 60/850,882, entitled "METHOD AND APPARATUS FOR MUTUAL AUTHENTICATION" filed Oct. 10, 2006. This Provisional Application is assigned to the assignee hereof and is hereby expressly incorporated by reference herein.

BACKGROUND

1. Field

The present invention relates generally to wireless communications, and more specifically to mutual authentication.

2. Background

A mobile subscriber may want to access content protected by a system which would require authentication with another entity or agent. A popular authentication protocol is the Internet Key Exchange (IKE) protocol, described in RFC 4306. However, the IKE protocol assumes that the entities in the authentication process have enough computing or processing power such that the speed of the authentication is not a concern.

There is therefore a need in the art for technique for efficient mutual authentication with a device having limited processing power.

SUMMARY

An aspect of the present invention may reside in a method for mutual authentication between a first entity and a second entity. In the method, the first entity initiates mutual authentication by sending a message to the second entity. The second entity verifies a first public key associated with the first entity, generates a first random number, encrypts the first random number using the first public key, and sends the encrypted first random number in a message to the first entity. The first entity verifies a second public key associated with the second entity, decrypts the encrypted first random number using a first private key corresponding to the first public key, generates a second random number, generating a first hash based on at least the first random number, encrypts the second random number and the first hash using the second public key, and sends the encrypted second random number and first hash in a message to the second entity. The second entity decrypts the encrypted second random number and first hash using a second private key corresponding to the second public key, verifies the first hash to authenticate the first entity, generates a second hash based on at least the second random number, and sends the second hash to the first entity. The first entity verifies the second hash to authenticate the second entity.

In more detailed aspects of the invention, the first entity and the second entity each derive a session encryption key and message authentication code (MAC) key using the first random number and the second random number based on a key derivation function, for use in communications between the first entity and the second entity.

Additionally, the message initiating mutual authentication may include a hash of at least one trusted root key and a corresponding certificate chain for the first entity. The certificate chain for the first entity may include the public key associated with the first entity. Also, the message from the second entity to the first entity having the encrypted first random number further may include a certificate chain for the second entity. The certificate chain for the second entity may include the public key associated with the second entity.

In other more detailed aspects of the invention, the first entity may be a digital rights agent of a mobile station, and the second entity may be a secure removable media device. The second entity may have limited processing power. Also, the first hash may be further based on the second random number such that the first hash is generated based on the first random number concatenated with the second random number. The second hash may be further based the first random number, or further based on the first hash such that the second hash may be based on the second random number concatenated with the first hash.

Another aspect of the invention may reside in an apparatus for mutual authentication including means for initiating mutual authentication, means for verifying a first public key, generating a first random number, and encrypting the first random number using the first public key, means for verifying a second public key, decrypting the encrypted first random number using a first private key corresponding to the first public key, generating a second random number, generating a first hash based on at least the first random number, and encrypting the second random number and the first hash using the second public key, means for decrypting the encrypted second random number and first hash using a second private key corresponding to the second public key, verifying the first hash for authentication, and generating a second hash based on at least the second random number, and means for verifying the second hash for authentication.

Another aspect of the invention may reside in a mobile station having mutual authentication with a secure removable media device, and including a digital rights agent. The digital rights agent initiates mutual authentication by sending a message to a secure removable media device, wherein the secure removable media device verifies a first public key associated with the digital rights agent, generates a first random number, encrypts the first random number using the first public key, and sends the encrypted first random number in a message to the digital rights agent. The digital rights agent verifies a second public key associated with the secure removable media device, decrypts the encrypted first random number using a first private key corresponding to the first public key, generates a second random number, generates a first hash based on at least the first random number, encrypts the second random number and the first hash using the second public key, and sends the encrypted second random number and first hash in a message to the secure removable media device, wherein the secure removable media device decrypts the encrypted second random number and first hash using a second private key corresponding to the second public key, verifies the first hash to authenticate the digital rights agent, generates a second hash based on at least the second random number, and sends the second hash to the digital rights agent. The digital rights agent verifies the second hash to authenticate the secure removable media device.

Yet another aspect of the invention may reside is computer program product comprising computer readable medium comprising code for causing a computer of a station having a digital rights agent to initiate mutual authentication by sending a message to a secure removable media device, wherein the secure removable media device verifies a first public key associated with the digital rights agent, generates a first random number, encrypts the first random number using the first public key, and sends the encrypted first random number in a message to the digital rights agent, code for causing a computer to cause the digital rights agent to verify a second public key associated with the secure removable media device, decrypt the encrypted first random number using a first private key corresponding to the first public key, generate a second random number, generate a first hash based on at least the first random number, encrypt the second random number and the first hash using the second public key, and send the encrypted second random number and first hash in a message to the secure removable media device, wherein the secure removable media device decrypts the encrypted second random number and first hash using a second private key corresponding to the second public key, verifies the first hash to authenticate the digital rights agent, generates a second hash based on at least the second random number, and sends the second hash to the digital rights agent, and code for causing a computer to cause the digital rights agent to verify the second hash to authenticate the secure removable media device.

Another aspect of the invention may reside in a computer program product, comprising computer readable medium comprising code for causing a computer to cause a secure removable media device to verify a first public key associated with a digital rights agent, generate a first random number, encrypt the first random number using the first public key, and send the encrypted first random number in a message to the digital rights agent, wherein the digital rights agent verifies a second public key associated with the secure removable media device, decrypts the encrypted first random number using a first private key corresponding to the first public key, generates a second random number, generates a first hash based on at least the first random number, encrypts the second random number and the first hash using the second public key, and sends the encrypted second random number and first hash in a message to the secure removable media device, and code for causing a computer to cause the secure removable media device to decrypt the encrypted second random number and first hash using a second private key corresponding to the second public key, verify the first hash to authenticate the digital rights agent, generate a second hash based on at least the second random number, and send the second hash to the digital rights agent, wherein the digital rights agent verifies the second hash to authenticate the secure removable media device.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
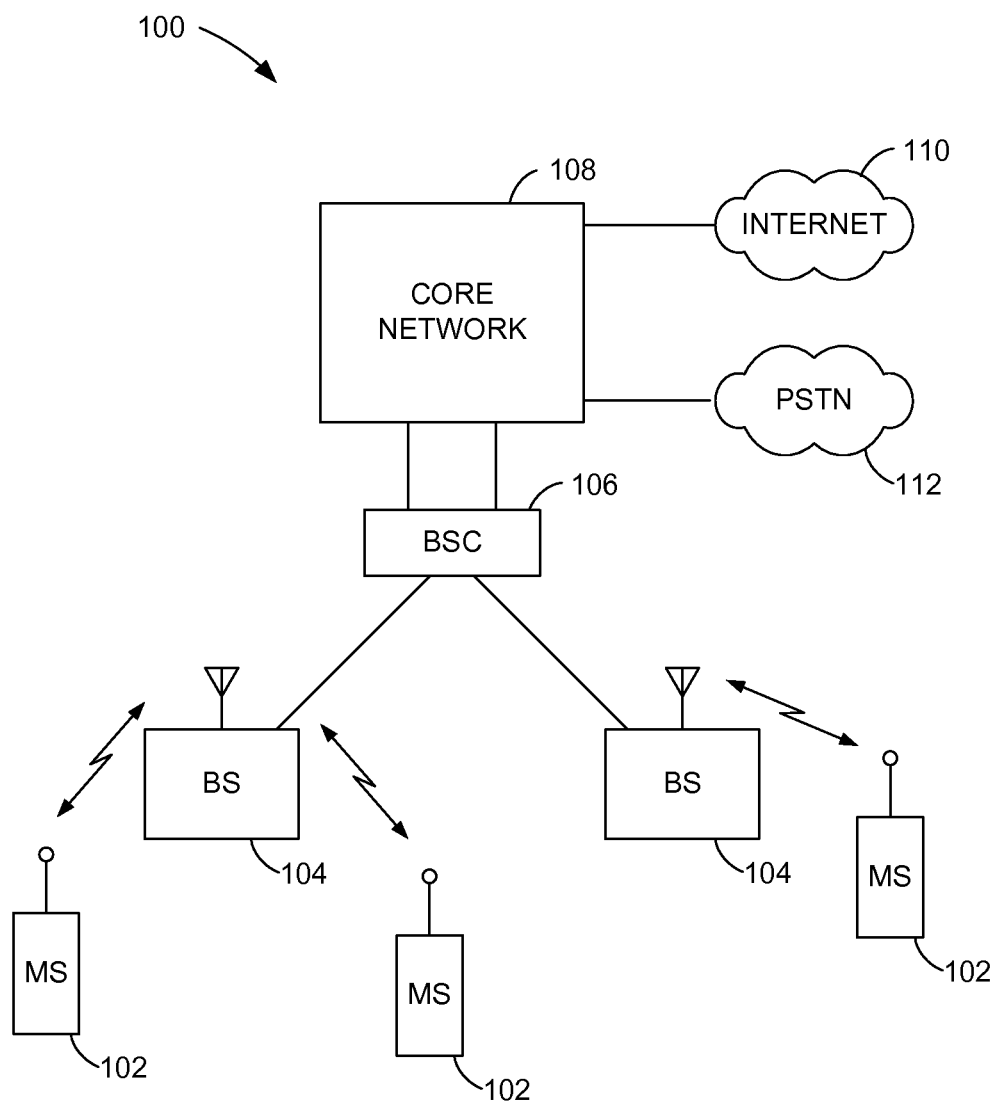
FIG. 1 is an example of a wireless communication system.
Figure 2:
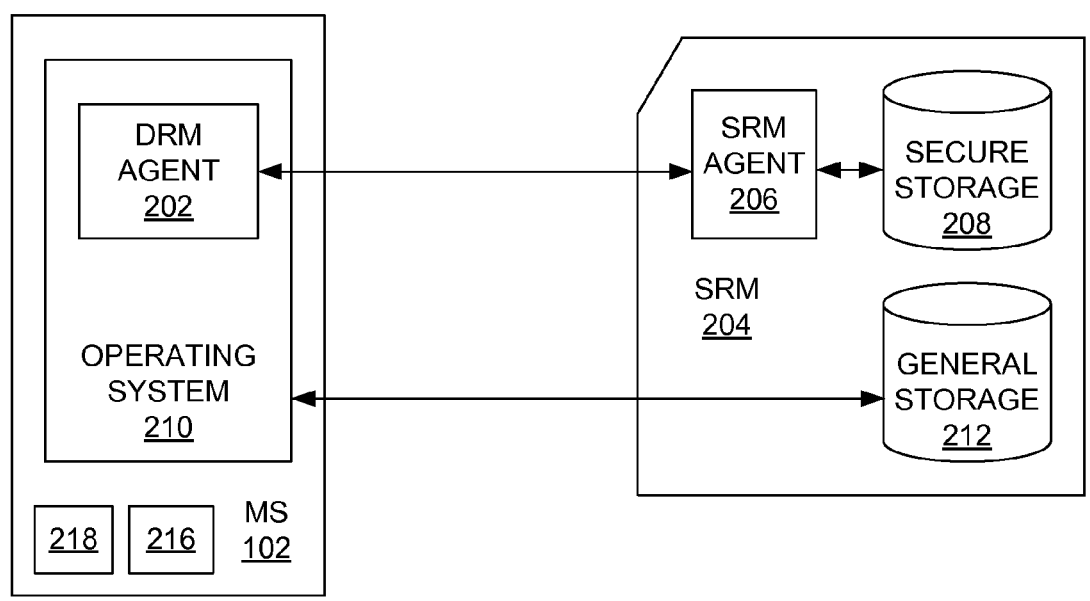
FIG. 2 is a block diagram of a mobile station and a secure removable media device having mutual authentication.

With reference to FIG. 2, a wireless communication system 100 includes one or more wireless mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Many low cost devices with limited computing power are being introduced into the market such as smart cards and flash memory (in many different form factors). Such devices may require authentication. For example, there is a desire to have these devices hold rights for use with Digital Rights Management (DRM) systems. Before exchanging rights with these devices, there should be mutual authentication of both entities involved in the exchange to limit the exchange to authorized entities. These embodiments provide an efficient method to accomplish the mutual authentication, and also provide a confirmed exchange of a secret that can be used in further communicates between the involved entities. The efficiency is both in terms of computing power and speed.

As apparent to one skilled in the art, the mutual authentication schemes can be used anytime mutual authentication between two entities is required. The mutual authentication schemes are not limited to the specific applications (such a Digital Rights Management), systems, and devices used here to describe the embodiments.

One embodiment of the invention performs a mutual authentication with a confirmed key exchange using the exchange of 4 messages. It requires 2 public key signature verifications (+1 for every intermediate certificate), 2 public key encryptions, 2 public key decryptions, 2 hash generations and 2 hash verifications. The specific number of message exchanges, public key verifications, public key decryptions, hash generations, and hash verifications may be split or altered to achieved required amounts of security and efficiency.

The efficiency of the protocol is enhanced by minimizing the number of public key cryptographic operations and using hash functions to provide proof of possession of the exchanged key material.

An efficient mutual authentication and confirmed key exchange protocol is described for use with compute-bound devices. The efficiency is accomplished by minimizing the number of public key operations and using cryptographic hashes to provide proof of possession.

Figure 3:
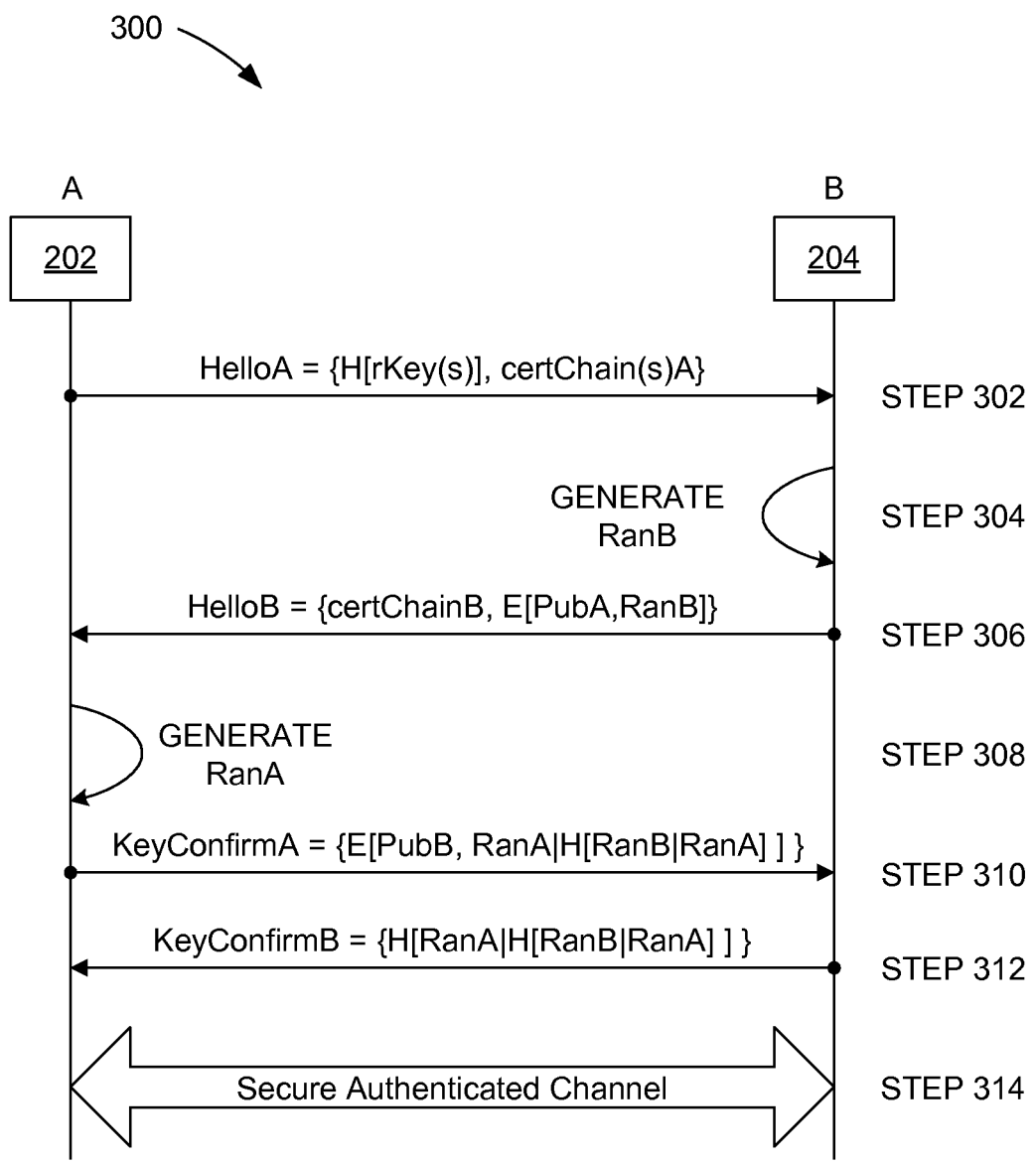
FIG. 3 is a flow diagram of a method for mutual authentication between a mobile station and a secure removable media device.

The protocol is illustrated with respect to FIGS. 2 and 3 showing a method 300 (FIG. 3) for mutual authentication. The steps below correspond to the numbered arrows in the FIG. 3.

In the method 300, Entity A, e.g., a DRM agent 202 of the MS 102, sends the HelloA message (step 302) to entity B, e.g., a secure removable media (SRM) device 204 having an SRM agent 206. The SRM agent manages access to secure storage 208 in the SRM device. (An operating system 210 of the MS may directly access general storage 212 of the SRM device.) HelloA consists of hashes of the trusted Root Keys (or the Root Keys themselves) and the corresponding certificate chains. Upon receiving this message, entity B finds a Root Key it trusts from the message and finds a certificate chain under the selected Root Key. It verifies entity A's certificate chain under the selected Root Key.

Entity B generates a random number RanB (step 304).

Entity B sends the HelloB message to entity A (step 306). HelloB consists of B's certificate chain under the selected Root Key and along with RanB encrypted with entity A's public key from the certificate chain selected after step 302. Upon receiving this message, entity A verifies entity B's certificate chain. If valid, it decrypts RanB with its private key (corresponding to the selected Root Key).

Note that once the Root Key selection and certificate chain exchange has occurred, entity A and entity B will have each other's certificate chain. Thus, these parameters may not need to be sent between entity A and entity B in future HelloA and HelloB messages for a future mutual authentication. In that case, the certificate chain exchange in steps 302 and 306 may be optional.

Entity A generates RanA (step 308).

Entity A sends the KeyConfirmA message to entity B (step 310). KeyConfirmA consists of RanA concatenated with the hash of RanB concatenated with RanA (H[RanA|RanB]) and all this encrypted with B's public key. Upon receiving this message, entity B decrypts it. Using the decrypted RanA, it verifies the hash of RanB concatenated with RanA. Note: at this step, entity B has authenticated entity A and is assured that entity A knows RanB.

Entity B sends the KeyConfirmB message to entity A (step 312). KeyConfirmB consists of the hash of the decrypted portion of the KeyConfirmA message. Upon receiving this message, entity A verifies the hash. Note: at this step, entity A has authenticated entity B and is assured that entity B knows RanA.

At this point, both entities have authenticated each other and have confirmed that they each share the same RanA and RanB. RanA and RanB can now be used to derive a session encryption key (SK) and a MAC key (MK) based on a Key Derivation Function (KDF) for use with further communications between the parties (step 314).

The messages details are given below. The HelloA message is sent to initiate the mutual authentication with key confirmation protocol. The HelloA has a "version" parameter and a "rootAndChains[ ]" parameter. The version parameter may be an 8 bit value that contains the protocol version of this message. It is mapped as the 5 MSBs for the major version and the 3 LSBs for the minor version. The rootAndChains[ ] parameter may be an array of the root hashes and certificate chains for entity A under all the trust models supported by A. The structure for the parameter, RootHashAndCertChain is a parameter rootHash, which is the SHA-1 hash of the trust model's root public key, and a parameter certChain, the entity's certificate chain under the root public key. The entity's certificate comes first followed by any CA certificates (in order of signing) up to but not including the root certificate.

The HelloB message continues the mutual authentication with key confirmation protocol by entity B. The following table describes the parameters. The HelloB has the parameters: "version", "status", "certChain", and "encRanB". The version parameter may be an 8 bit value that contains the protocol version of this message. It is mapped as the 5 MSBs for the major version and the 3 LSBs for the minor version. The status parameter may be an 8 bit value that contains the status of entity B processing the HelloA message. Values for the status parameter may be 0 for success—no error were encountered with the previous message, and 1 for noSharedRootKey—entity B did not find a root key that it shares with entity A. Values 2-255 may be reserved for future use. The certChain parameter is entity B's certificate chain under a root key selected from the HelloA message. If the value of the status parameter is not success, the certChain parameter is not present. The encRanB parameter is an RSA-OAEP encrypted ranB, using the public key of entity A (from the selected certificate chain). ranB may be 20 byte random number generated by entity B. If the value of status is not success, the encRanB parameter is not present.

The KeyConfirmA message continues the mutual authentication with key confirmation protocol by entity A. The KeyConfirmA message has a "version" parameter and a "encRanB" parameter. The version parameter may be an 8 bit value that contains the protocol version of this message. It may be mapped as the 5 MSBs for the major version and the 3 LSBs for the minor version. The encRanB parameter may be an RSA-OAEP encrypted KeyConfirmData structure having a "ranA" parameter and a "hashBA" parameter. The ranA parameter may be a 20-byte random number generated by entity A, and the hash BA parameter may be the SHA-1 hash of ranB concatenated with ranA.

The KeyConfirmB message finalizes the mutual authentication with key confirmation protocol by entity B. The KeyConfirmB message has a "version" parameter, a status parameter, and a "hashKeyConfirm" parameter. The version parameter may be an 8 bit value that contains the protocol version of this message. It may be mapped as the 5 MSBs for the major version and the 3 LSBs for the minor version. The status parameter may be an 8 bit value that contains the status of entity B processing the message. The hashKeyConfirm parameter may be the SHA-1 hash of the KeyConfirmData structure that was decrypted by entity B. If the value of the status parameter is not success, this parameter is not present.

Another aspect of the invention may reside in a mobile station 102 including a control processor 216 and the OS 210 for causing the DRM agent 202 to implement the method 300. Yet another aspect of the invention may reside in a computer program product comprising computer readable medium (such as a memory device 218) comprising code for causing a computer to cause the DRM agent to perform the steps of the method 300.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for mutual authentication between first entity of hardware and a second entity of hardware, comprising:
   the first entity initiating mutual authentication by sending a message to the second entity;
   the second entity verifying a first public key associated with the first entity, generating a first random number, encrypting the first random number using the first public key in a first encryption, and sending the encrypted first random number in a message to the first entity;
   the first entity verifying a second public key associated with the second entity, decrypting the encrypted first random number using a first private key corresponding to the first public key in a first decryption, generating a second random number, generating a first hash based on at least the first random number, encrypting the second random number and the first hash using the second public key in a second encryption, and sending the encrypted second random number and first hash in a message to the second entity;
   the second entity decrypting the encrypted second random number and first hash using a second private key corresponding to the second public key in a second decryption, verifying the first hash to authenticate the first entity, generating a second hash based on at least the second random number, and sending the second hash to the first entity; and
   the first entity verifying the second hash to authenticate the second entity:,
   wherein the mutual authentication is limited to no more than two encryptions comprising the first and second encryptions, and is limited to no more than two decryptions comprising the first and second decryptions.

2. The method for mutual authentication as defined in claim 1, wherein the first entity and the second entity each derive a session encryption key and message authentication code (MAC) key using the first random number and the second random number based on a key derivation function, for use in communications between the first entity and the second entity.

3. The method for mutual authentication as defined in claim 1, wherein the message initiating mutual authentication includes a hash of at least one trusted root key and a corresponding certificate chain for the first entity.

4. The method for mutual authentication as defined in claim 1, wherein the message from the second entity to the first entity having the encrypted first random number further includes a certificate chain for the second entity.

5. The method for mutual authentication as defined in claim 1, wherein the first entity is a digital rights agent and the second entity is a secure removable media device.

6. The method for mutual authentication as defined in claim 1, wherein the first entity is a mobile station.

7. The method for mutual authentication as defined in claim 1, wherein the second entity has limited processing power.

8. The method for mutual authentication as defined in claim 1, wherein the first hash is further based on at least the second random number such that the first hash is generated based on at least the first random number concatenated with the second random number.

9. The method for mutual authentication as defined in claim 1, wherein the second hash is further based on at least the first random number.

10. The method for mutual authentication as defined in claim 1, wherein the second hash is further based on at least the first hash such that the second hash is generated based on at least the second random number concatenated with the first hash.

11. Apparatus for mutual authentication comprising:
a memory;
a processor coupled to the memory, the processor configured to:
initiate mutual authentication;
verify a first public key, generate a first random number, and encrypt the first random number using the first public key in a first encryption;
verify a second public key, decrypt the encrypted first random number using a first private key corresponding to the first public key in a first decryption, generate a second random number, generate a first hash based on at least the first random number, and encrypt the second random number and the first hash using the second public key in a second encryption;
decrypt the encrypted second random number and first hash using a second private key corresponding to the second public key in a second decryption, verify the first hash for authentication, and generate a second hash based on at least the second random number; and
verify the second hash for authentication;
wherein the mutual authentication is limited to no more than two encryptions comprising the first and second encryptions, and is limited to no more than two decryptions comprising the first and second decryptions.

12. The apparatus for mutual authentication as defined in claim 11, wherein the processor is further configured to derive a session encryption key and message authentication code (MAC) key using the first random number and the second random number based on a key derivation function, for use in communications between a first entity and a second entity.

13. The apparatus for mutual authentication as defined in claim 11, wherein the first hash is further based on at least the second random number such that the first hash is generated based on at least the first random number concatenated with the second random number.

14. The apparatus for mutual authentication as defined in claim 11, wherein the second hash is further based on at least the first random number.

15. The apparatus for mutual authentication as defined in claim 11, wherein the second hash is further based on the first hash such that the second hash is generated based on the second random number concatenated with the first hash.

16. A station having mutual authentication between a first entity and a second entity of a device, comprising:
a first entity, wherein:
the first entity is configured to initiate mutual authentication by sending a message to the second entity, wherein the second entity verifies a first public key associated with the first entity, generates a first random number, encrypts the first random number using the first public key in a first encryption, and sends the encrypted first random number in a message to the first entity;
the first entity is configured to verify a second public key associated with the second entity, decrypts the encrypted first random number using a first private key corresponding to the first public key in a first decryption, generates a second random number, generates a first hash based on at least the first random number, encrypts the second random number and the first hash using the second public key in a second encryption, and sends the encrypted second random number and first hash in a message to the second entity, wherein the second entity decrypts the encrypted second random number and first hash using a second private key corresponding to the second public key in a second decryption, verifies the first hash to authenticate the first entity, generates a second hash based on at least the second random number, and sends the second hash to the first entity; and
the first entity is configured to verify the second hash to authenticate the second entity;
wherein the mutual authentication is limited to no more than two encryptions comprising the first and second encryptions, and is limited to no more than two decryptions comprising the first and second decryptions.

17. The station having mutual authentication as defined in claim 16, wherein the first entity and the second entity are each configured to derive a session encryption key and message authentication code (MAC) key using the first random number and the second random number based on a key derivation function, for use in communications between the first entity and the second entity.

18. The station having mutual authentication as defined in claim 16, wherein the message sent by the first entity to initiate mutual authentication includes a hash of at least one trusted root key and a corresponding certificate chain for the first entity.

19. The station having mutual authentication as defined in claim 18, wherein the certificate chain for the first entity includes the public key associated with the first entity.

20. The station having mutual authentication as defined in claim 16, wherein the message sent by the second entity to the first entity having the encrypted first random number further includes a certificate chain for the second entity.

21. The station having mutual authentication as defined in claim 20, wherein the certificate chain for the second entity includes the public key associated with the second entity.

22. The station having mutual authentication as defined in claim 16, wherein the station is a mobile station.

23. The station having mutual authentication as defined in claim 16, wherein the first hash is further based on at least the second random number such that the first entity generates the first hash based on at least the first random number concatenated with the second random number.

24. The station having mutual authentication as defined in claim 16, wherein:
the first entity comprises a digital rights agent; and
the second entity comprises a secure removable media device.

25. A computer program product, comprising:
non-transitory computer readable medium comprising:
code for causing a computer to cause a digital rights agent of a station to initiate mutual authentication by sending a message to a secure removable media device, wherein the secure removable media device verifies a first public key associated with the digital rights agent, generates a first random number, encrypts the first random number using the first public key in a first encryption, and sends the encrypted first random number in a message to the digital rights agent;

code for causing a computer to cause the digital rights agent to verify a second public key associated with the secure removable media device, decrypt the encrypted first random number using a first private key corresponding to the first public key in a first decryption, generate a second random number, generate a first hash based on at least the first random number, encrypt the second random number and the first hash using the second public key in a second encryption, and send the encrypted second random number and first hash in a message to the secure removable media device, wherein the secure removable media device decrypts the encrypted second random number and first hash using a second private key corresponding to the second public key in a second decryption, verifies the first hash to authenticate the digital rights agent, generates a second hash based on at least the second random number, and sends the second hash to the digital rights agent; and code for causing a computer to cause the digital rights agent to verify the second hash to authenticate the secure removable media device;

wherein the mutual authentication is limited to no more than two encryptions comprising the first and second encryptions, and is limited to no more than two decryptions comprising the first and second decryptions.

26. A computer program product, comprising:
non-transitory computer readable medium comprising:
code for causing a computer to cause a secure removable media device to verify a first public key associated with a digital rights agent, generate a first random number, encrypt the first random number using the first public key in a first encryption, and send the encrypted first random number in a message to the digital rights agent, wherein the digital rights agent verifies a second public key associated with the secure removable media device, decrypts the encrypted first random number using a first private key corresponding to the first public key in a first decryption, generates a second random number, generates a first hash based on at least the first random number, encrypts the second random number and the first hash using the second public key in a second encryption, and sends the encrypted second random number and first hash in a message to the secure removable media device; and code for causing a computer to cause the secure removable media device to decrypt the encrypted second random number and first hash using a second private key corresponding to the second public key in a second decryption, verify the first hash to authenticate the digital rights agent, generate a second hash based on at least the second random number, and send the second hash to the digital rights agent, wherein the digital rights agent verifies the second hash to authenticate the secure removable media device;

wherein mutual authentication between the secure removable media device and the digital rights agent is limited to no more than two encryptions comprising the first and second encryptions, and is limited to no more than two decryptions comprising the first and second decryptions.

27. A method for mutual authentication between first entity of hardware and a second entity of hardware, comprising:

the first entity initiating mutual authentication by sending a message to the second entity, wherein the second entity is configured to verify a first public key associated with the first entity, generating a first random number, encrypt the first random number using the first public key in a first encryption, and send the encrypted first random number in a message to the first entity;

the first entity receiving the message and verifying a second public key associated with the second entity, decrypting the encrypted first random number using a first private key corresponding to the first public key in a first decryption, generating a second random number, generating a first hash based on at least the first random number, encrypting the second random number and the first hash using the second public key in a second encryption, and sending the encrypted second random number and first hash in a message to the second entity, wherein the second entity is configured to decrypt the encrypted second random number and first hash using a second private key corresponding to the second public key in a second decryption, verify the first hash to authenticate the first entity, generate a second hash based on at least the second random number, and send the second hash to the first entity; and the first entity receiving and verifying the second hash to authenticate the second entity;

wherein the mutual authentication is limited to no more than two encryptions comprising the first and second encryptions, and is limited to no more than two decryptions comprising the first and second decryptions.

28. The method for mutual authentication as defined in claim 27, wherein the first hash is further based on at least the second random number such that the first hash is generated based on at least the first random number concatenated with the second random number.

29. Apparatus for mutual authentication with a second entity of hardware; comprising:
a memory;
a processor coupled to the memory, the processor configured to:
initiate mutual authentication by sending a message to the second entity, wherein the second entity is configured to verify a first public key associated with the apparatus, generate a first random number, encrypt the first random number using the first public key in a first encryption, and send the encrypted first random number in a message to the apparatus;

receive the message and verify a second public key associated with the second entity, decrypt the encrypted first random number using a first private key corresponding to the first public key in a first decryption, generate a second random number, generate a first hash based on at least the first random number, encrypt the second random number and the first hash using the second public key in a second encryption, and send the encrypted second random number and first hash in a message to the second entity, wherein the second entity is configured to decrypt the encrypted second random number and first hash using a second private key corresponding to the second public key in a second decryption, verify the first hash to authenticate the apparatus, generate a second hash based on at least the second random number, and send the second hash to the apparatus; and receive and verify the second hash to authenticate the second entity; wherein the mutual authentication is limited to no more than two encryptions comprising the first and second encryptions, and is limited to no more than two decryptions comprising the first and second decryptions.

30. The apparatus for mutual authentication as defined in claim 29, wherein the first hash is further based on at least the second random number such that the first hash is generated based on at least the first random number concatenated with the second random number.

* * * * *